UNITED STATES PATENT OFFICE.

AUGUSTE J. ROSSI, OF NIAGARA FALLS, NEW YORK, ASSIGNOR TO THE TITANIUM ALLOY MANUFACTURING COMPANY, OF NEW YORK, N. Y., A CORPORATION OF MAINE.

ZINC AND METHOD OF PURIFYING AND IMPROVING THE SAME.

1,020,512.     Specification of Letters Patent.     Patented Mar. 19, 1912.

No Drawing.     Application filed January 6, 1911. Serial No. 601,162.

*To all whom it may concern:*

Be it known that I, AUGUSTE J. ROSSI, a citizen of the United States, residing at Niagara Falls, in the county of Niagara and State of New York, have invented certain new and useful Improvements in Zinc and Methods of Purifying and Improving the Same, of which the following is a specification.

Zinc, while in molten state, absorbs gaseous elements or compounds, which are dissolved in the metal and retained therein as it solidifies during cooling. For instance oxygen from the atmosphere is thus absorbed and, to an extent, combines chemically with other elements present forming oxids thereof, as for example oxids of zinc, which together with oxygen if any remaining uncombined are found occluded in the mass of the solidified metal. Moreover throughout said mass are also found, to greater or less extent, other substances, or compounds, foreign to zinc, as for instance drosses, or slags, which owing to their comparative infusibility or lack of fluidity or both are unable to rise out of the molten metal and consequently may to greater or less extent remain entangled therein after its solidification.

The aforesaid foreign elements and compounds are usually unhomogeneously distributed in uncontrollable locations throughout the mass of the metal, thus producing "blow-holes" or other cavities devoid of zinc which proportionately, and undesirably, impair the metallic continuity of the mass, thus diminishing its efficiency for many of its present industrial uses, as for example in galvanizing so called in which it is particularly important that the coating of zinc applied shall be continuous and impervious. I believe that it has hitherto proved impossible to produce or melt zinc, at least on an industrial as distinguished from a laboratory scale, involving refinings commercially impracticable, without incorporation and retention in the resulting metallic mass of such foreign elements and compounds, and to such extent, as to preclude its possession in theoretically normal degree of desirable physical properties to be expected as characterizing pure zinc.

The object of my present invention is to provide methods of treatment whereby with such economy, simplicity and speed as to be practicable on an industrial scale, zinc possessing superior properties may be produced in masses substantially devoid of undesired foreign elements and compounds including slags. I attain said objects by means of my novel procedure hereinafter described, viz:—I have discovered that if to zinc, as now produced in the industrial arts, and while it is melting or molten, there be added merely enough titanium to satisfy chemical affinity therefor of all such undesired elements present, whether in free or combined state, all these, including drosses and slags, and, besides, such titanium so added, will be eliminated from the molten mass, the resulting product being substantially solid pure zinc.

My said invention comprises the following procedures: To a bath comprising the melting, or molten, zinc to be treated, I may impart the presence of metallic titanium in such small quantity, proportioned as nearly as possible, as is sufficient merely to satisfy the chemical affinities therefor of the said undesired elements and compounds present. The said proportion of titanium required may be determined in any convenient manner, as, for example, by usual calculations based on the kinds and proportions of said undesired elements and compounds as disclosed by preliminary chemical analyses of specimens of the mass of any given type of commercial or other zinc desired to be treated; or by varying tentatively the proportions of titanium so added until attainment of a final product containing substantially neither said undesired elements and compounds nor substantially any titanium, the proportion of latter used with such result being that required for purification of the particular type of zinc mass so tested. The titanium is so added preferably in its elemental or metallic form, as, for example, an alloy of titanium with some metal, preferably in most cases an alloy of titanium with zinc having a content of 10% to 12% or thereabout of titanium and producible on an industrial scale for example by means of the method specified in my Letters Patent No. 979,393, dated Dec. 20, 1910. In some instances, where presence of some metal other than zinc in the final product is not objectionable or is desired, the titanium may be added in the form of its alloy with such other metal, as, for example, with iron, this being the alloy of my Letters Patent No. 609,466, dated August 23, 1898; or with copper, this being the alloy of my Letters Patent No. 700,244, dated May 20, 1902, reissued March 17, 1908, No. 12,764.

Addition of the titanium in other forms, as for instance that of its oxid may, where conditions are developed enabling the same to ultimately yield to the zinc the required proportion of metallic titanium, be practiced without departing from my invention. The titanic material employed may be preferably added in such sub-divided state as will facilitate to an extent its distribution relatively to the mass of molten zinc.

The titanic material may be charged into the crucible or other container of the bath prior to introduction thereinto of the melting or molten zinc, or it may be charged upon the latter, in which case a covering of molten slag or the like may be superimposed as per my Letters Patent No. 877,518, dated January 28, 1908 to prevent reactions with constituents of the atmosphere. It appears, however, that, notwithstanding the higher melting point and the lower specific gravity of titanium as compared with zinc, elemental titanium in the aforesaid proportion, however added, is able to reach, and react upon, or chemically combine with, all undesired elements and compounds present in the mass of molten zinc. After addition of the titanium, the temperature of the bath is maintained at fully that of the melting point of zinc and will be found to be somewhat heightened by the said chemical reactions and combinations attributable to the presence of the titanium, and until these have fully taken place, the time required for these being usually but a few minutes.

The titanium appears to not only combine chemically with undesired elements present, such as free oxygen and nitrogen, but also, by reason of its intenser affinity for such elements, to reduce compounds thereof, such as oxid of zinc for example, and to combine with the oxygen thus liberated to form oxid of titanium, the presence of which in the bath imparts to therein occluded drosses or slags sufficient fluidity to insure their rising properly to the surface of the molten mass, and besides this, in cases in which the titanium added is insufficient in amount to both combine with undesired elements and in addition to completely deoxidize the entire amount of oxid of zinc present, the titanium oxid already formed as aforesaid will proceed to further combine with such remaining undecomposed oxids of zinc to form a titanate of zinc which I have found to also similarly increase the fluidity and fusibility of the drosses or slags and thus insure their removal at expenditure of less titanium than theoretically required for combination with all undesired elements and compounds present.

After the aforesaid operations the molten zinc may be tapped out and cast in the usual manner.

It will be understood that while a final zinc product free from titanium as well as the impurities mentioned is primarily desired and represents one feature of my present invention, nevertheless, for some purposes, presence incidentally of some little titanium in the resulting product may be unobjectionable or desirable. Such instances may be those in which the proportion of titanium remaining in the final product is less than say 1% being an amount insufficient to justify its designation as an "alloy" of titanium in the usual commercial sense, or dependence on such small amount of titanium for purposes other than to improve said product itself. Such instances I regard as being within the purview of my present improvements, the presence of such small percentages of titanium imparting improved physical properties and also tending to prevent absorption of gaseous impurities whenever the zinc containing it is remelted for any purpose. To retain said small percentage of titanium in the product it is only necessary to increase accordingly the proportioned amounts of titanium added as hereinbefore described.

My process results in imparting to the zinc thereby treated the peculiar distinctly crystalline structure desired in zinc and often characteristic of the most carefully and expensively refined specimens of that metal though notably absent in the usual zinc of commerce.

The treatment of zinc as per my above described invention results in a novel final product which is characterized as being a continuously solid mass consisting throughout of substantially pure metallic zinc; as being substantially devoid of undesired elements or compounds including drosses and slags; as containing less than 1% of titanium; as free from blow-holes and other physical imperfections due to presence or action of elements and substances other than zinc, and as of greater density and tensile strength and possessing a highly crystalline structure.

What I claim as new and desire to secure by Letters Patent is the following, viz:—

1. The method of improving the properties of zinc which consists in adding thereto while molten titanium in amount sufficient to result in a final product containing titanium not to exceed 1%.

2. The method of improving the properties of zinc which consists in adding thereto while molten an alloy containing titanium in amount sufficient to result in a final product containing titanium not to exceed 1%.

3. The method of improving the properties of zinc which consists in adding thereto while molten an alloy containing zinc and titanium in amount sufficient to result in a final product containing titanium not to exceed 1%.

4. As a new article a metallic body composed preponderatingly of zinc and containing titanium not to exceed 1%.

5. As a new article zinc containing titanium not to exceed 1%.

AUGUSTE J. ROSSI.

Witnesses:
WALTER D. EDMONDS,
GEORGE G. MEASURES.